Aug. 10, 1926.

S. MACOMBER 1,595,160

TESTING APPARATUS

Filed Sept. 21, 1925    2 Sheets-Sheet 2

INVENTOR.
Stanley Macomber
BY
Fay, Oberlin & Fay
ATTORNEYS

Patented Aug. 10, 1926.

1,595,160

UNITED STATES PATENT OFFICE.

STANLEY MACOMBER, OF MASSILLON, OHIO.

TESTING APPARATUS.

Application filed September 21, 1925. Serial No. 57,609.

The present improvements relate more particularly to an apparatus or machine for testing trusses or truss-like structural units. Particularly where such unit is fabricated from a plurality of bar or rod elements, it becomes important to test the load sustaining capacity of the unit and to make sure not only that the component parts will stand up properly, but also that they have been properly united together. Structural units of the type in question are manufactured in a variety of lengths and one object of the present invention, accordingly, is to provide a machine or apparatus which may be readily adjusted to test such units, irrespective of their length, within certain maximum and minimum limits. A further object is to arrange the apparatus so that the testing may be quickly and easily accomplished with a minimum of time and labor on the part of the operatives in charge of the apparatus.

To the accomplishment of the foregoing and related ends, the invention, then, consists of the means hereinafter fully described and particularly pointed out in the claims, the annexed drawings and the following description setting forth in detail certain mechanism embodying the invention, such disclosed means constituting, however, but one of various mechanical forms in which the principle of the invention may be used.

In said annexed drawings:—

Figure 1:
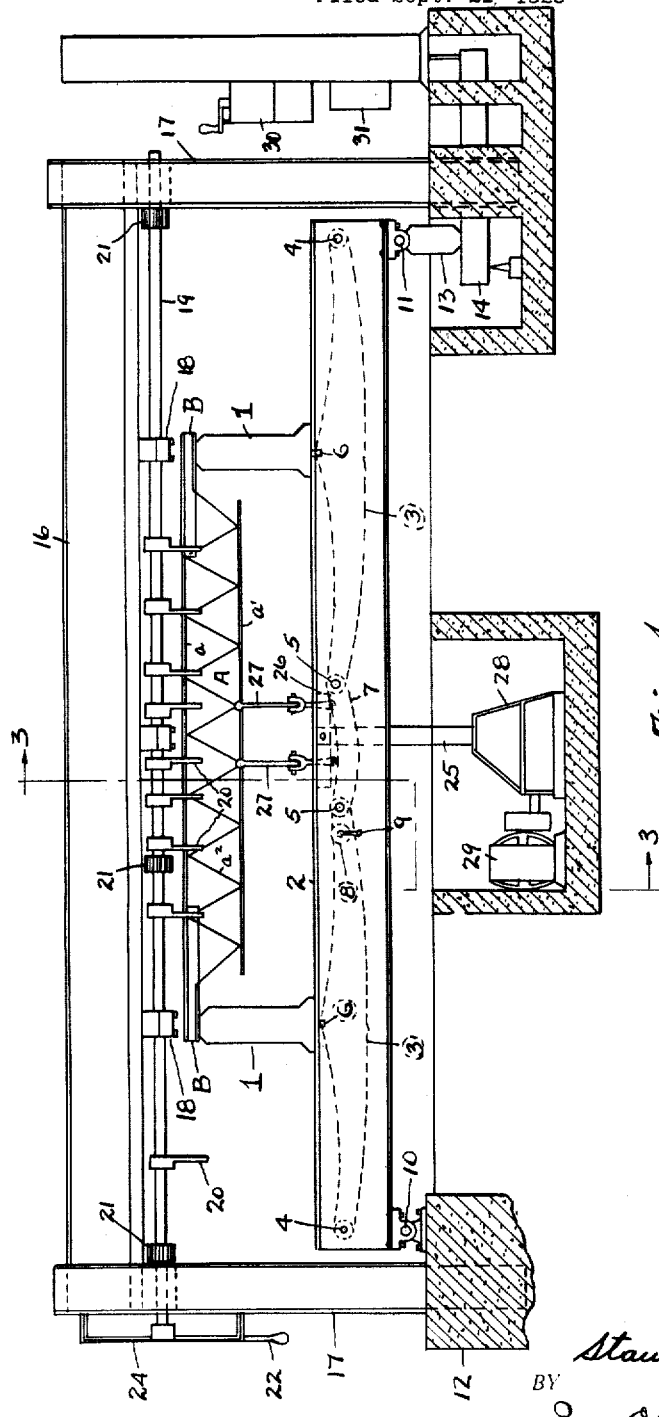
Figure 2:
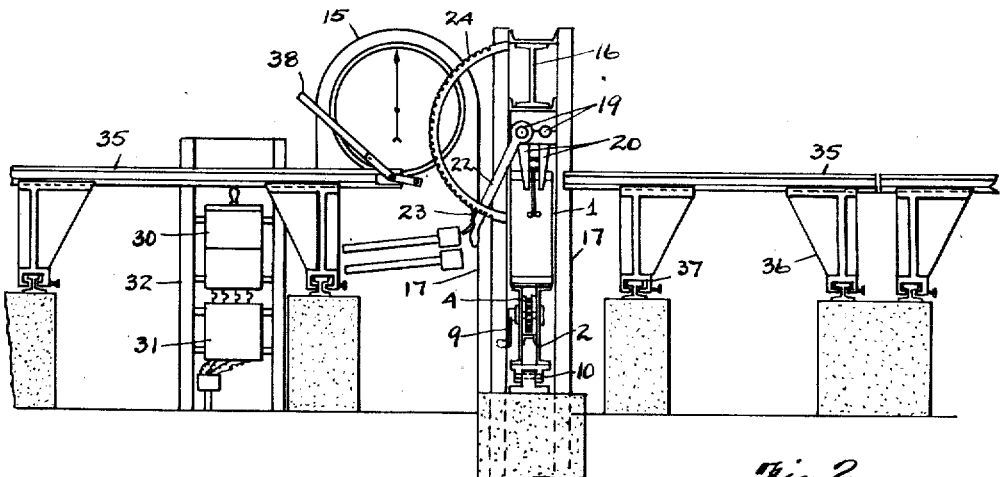
Figure 3:
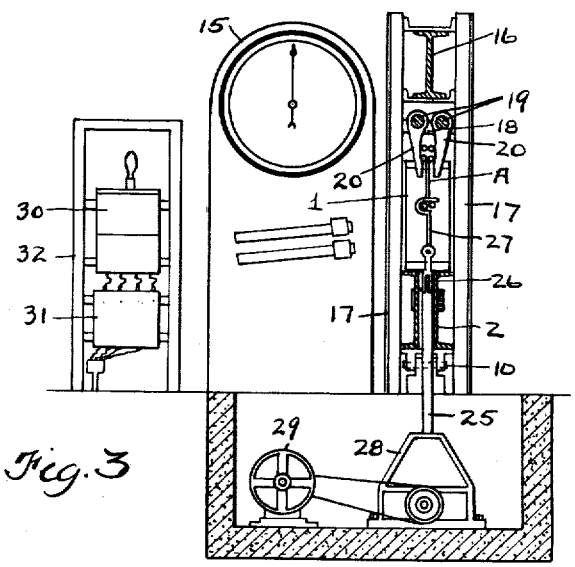

Fig. 1 is a side elevation of a testing machine embodying my present improvements; Fig. 2 is an end elevation thereof, as viewed from the left in Fig. 1, certain accessory racks for handling the units to be tested appearing in side elevation; and Fig. 3 is a transverse section of the machine, the plane of the section being indicated by the line 3—3, Fig. 1, and certain parts beyond such plane appearing in elevation.

Various types of structural units of the general class identified above may of course be tested by the apparatus, but for the purpose of illustration, the machine illustrated in Fig. 1 is shown as adjusted for operation on a Massillon bar joist, as it is known in the trade, this joist consisting of a central truss portion A and beam portions B extending beyond the ends of the truss portion, each of said beam extensions affording a multiplicity of points of support for the whole unit. The central truss portion proper comprises an assembly of straight rods that form the top and bottom chords $a$ and $a'$, respectively, such chords being joined together by another rod or bar $a^2$ that constitutes the web member of the structure, such last mentioned bar being bent reversely to form a succession of oppositely directed V's. The several bars are electrically welded or otherwise permanently and rigidly secured together and the beam extensions B are similarly attached to the central truss portion.

In order to test the load carrying capacity of a joist constructed as aforesaid, it is necessary to impose a downward pressure on the same, while its ends B are supported at points spaced apart the same distance as in the building in which such joists are to be utilized. For the purpose of thus supporting the ends of the joist, the machine is provided with two movable supports or posts 1, which receive the test load of a joist resting thereon, as shown in Fig. 1, and transfer said load to a heavy beam 2 whereon said posts are longitudinally adjustably mounted. Flexible, endless chains or cables 3 are provided, one in connection with each such post, each of these cables passing around a pair of sheaves or sprockets 4 and 5 and being attached at one point 6 to the base of the corresponding post. The two sheaves 5 are interconnected by a third cable 7 and a sheave 8 equipped with a crank 9 has engagement with one of said cables 3 so that upon rotation of said crank, the two cables 3 will be drawn in opposite directions. A corresponding in or out movement will obviously be imparted to the posts 1.

Beam 2, as shown in the end view and section thereof (Figs. 2 and 3 respectively), is constructed of two channels with a channel separator and serves to transfer the load received from the posts 1 to bearings 10 and 11 at the respective ends of said beam. Of said bearings, the first named rests on a concrete base 12, or equivalent fixed support, while the other is attached to a post 13 that rests on a scale platform 14. The latter is connected with a dial 15 or equivalent indicator which is properly graduated to show the load imposed on the platform 14.

Located above and longitudinally aligned with beam 2 is a second beam 16 that is fixedly supported at its respective ends by columns 17 and journaled in suitable bearings 18 on the under side of said beam 16 are two parallel shafts 19 that carry a series of radially projecting fingers 20. These shafts are interconnected by means of pairs of gears 21, located at suitable intervals along said shafts, so that upon oscillation of the one shaft, the other will be swung in the opposite direction. The fingers 20 may thus be swung in or out, as desired, and when in a horizontally extending position permit the ready placement of a joist A to be tested on the supports 1, while in their downwardly projecting positions, said fingers serve to hold such joist firmly in an upright position. For the purpose of oscillating the shafts 19 thus to swing the fingers 20, an operating lever 22 is attached to one end of one of said shafts, a catch 23 on said lever co-operating with a toothed segment 24 to hold the parts in question in desired position.

Centrally located with respect to beam 2 is a pulling mechanism that includes a vertical draw bar 25, that with a crosshead 26 at its upper end projects into the space between the two channels that compose said beam 2. Said crosshead is equipped with two pivotally attached hooks 27 that are adapted to engage with the lower chord of the joist A, when the draw bar is sufficiently raised and serve to exert a downward pull on said chord and thus on the joist when said draw bar is drawn downwardly. The crosshead 26, it will be noted, is pivotally attached to the draw bar so as to constitute in effect an equalizer. Details of the pulling mechanism 28 proper are not of present interest, except to note that such mechanism is belt driven by an electric motor 29 and that when operated in one direction, it pulls down on the draw bar and upon reversal releases such bar. A manually operated controller 30 and resistance unit 31 for the motor 29 are mounted on a stand 32 adjacent the same end of the machine where the scale dial 15 is located. An operator at this end of the machine may accordingly watch the reading on said dial as the downward pull exerted on the joist through draw bar 25 is increased and release said draw bar instantly when a predetermined load is reached.

To facilitate the handling of the joists, a plurality of horizontally extending rails 35 is provided on each side of the machine. These rails are carried by brackets 36 that are adjustable on transverse rails 37 so that the spacing of said rails 35 may be varied to accommodate the particular size of joist that may at the time be passing through the machine. The rails 35 on the left hand side of the machine, this being the outgoing side for the product being tested, as will be noted, terminate short of the machine and are provided with pivotal extensions 38 that will normally extend horizontally close up to the machine but which may be swung upwardly and out of the way, as shown in Fig. 2, thus providing for free access to the machine when desired.

The operation of the machine or apparatus as a whole may now be briefly set forth. Upon ascertaining the size of the joist to be tested, the supports or posts 1 are first moved into proper position by means of crank 9 so that they will accommodate the maximum span of the joist to be tested, allowing for the necessary bearing on each end. The operating lever 22 is then thrown up so as to move fingers 20 into their horizontal position. It has already been indicated that the joists to be tested will be placed upon the rails 35 at the right of the machine, as shown in Fig. 2. The men operating the machine will stand at the opposite side thereof and reaching through with hooks, or like implements, will pull the first joist forwardly into position on the posts 1. Operating lever 22 is then thrown down so as to move the fingers 20 into their vertical position, hooks 27 are swung up into engagement with the bottom chord of the joist, and where the latter has a web of the form shown, such hooks will be thus engaged with the two loops or angles of the web nearest the center. It will be noted that the hooks are adjustable along the equalizer bar 26 so that they may be thus fitted to the loops of joists of different size.

When the foregoing is done, the motor 29 is started so as to actuate mechanism 28 to pull down on the draw bar 25, thereby imposing a load on the joist through the equalizing bar 26 and hooks 27. This load will be equally distributed through the posts 1 to beam 2 and being centered exactly of the beam, one-half of the load will be imposed on each of the pivot bearings 10 and 11. Consequently the load shown on dial 15 is one-half of the load imposed on the joist and for this reason either the scale of such dial should read double the amount imposed on the platform 14 or the joist should be loaded only until the scale dial shows one-half of the load to which it is to be tested.

The proper load having been shown on the dial, controller 30 is thrown to reverse the motor, as a result of which the draw bar 25 is pushed upwardly so as to relieve the pressure on hooks 27. The latter are thereupon withdrawn from engagement with the joist, the operating lever 22 is swung up to open the fingers 20 and allow the joist to be removed onto the rails 35 on the left hand side of the machine. The foregoing operation is then repeated with the next joist and so on.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In apparatus for testing structural units of the type described, the combination with load indicating means; of a beam supported on a fixed pivot at one end and having its other end connected with said means; two spaced posts mounted on said beam; and mechanism adapted detachably to engage with and apply a downward pull on a structural unit resting on said posts.

2. In apparatus for testing structural units of the type described, the combination with load indicating means; of a beam supported on a fixed pivot at one end and having its other end connected with said means; two spaced posts movably mounted on said beam so as to be adjustable therealong; and mechanism adapted detachably to engage with and apply a downward pull on a structural unit resting on said posts.

3. In apparatus for testing structural units of the type described, the combination with load indicating means; of a beam supported on a fixed pivot at one end and having its other end connected with said means; two spaced posts mounted on said beam; means operatively connected with said posts adapted simultaneously to move the same towards or from each other; and mechanism adapted detachably to engage with and apply a downward pull on a structural unit resting on said posts.

4. In apparatus for testing structural units of the type described, the combination with load indicating means; of a beam supported on a fixed pivot at one end and having its other end connected with said means; two spaced posts mounted on said beam; endless cables on said beam connected with said posts, respectively; means adapted to draw said cables simultaneously in opposite directions, whereby said posts are similarly moved towards or from each other; and mechanism adapted detachably to engage with and apply a downward pull on a structural unit resting on said posts.

5. In apparatus for testing structural units of the type described, the combination with load indicating means; of a beam supported on a fixed pivot at one end and having its other end connected with said means; two spaced posts mounted on said beam; a vertically movable bar located midway between said posts; mechanism connected with the lower end of said bar and adapted to pull downwardly thereon; and hook means carried by the upper end of said bar and adapted detachably to engage with a structural unit resting on said posts.

6. In apparatus for testing structural units of the type described, the combination with load indicating means; of a beam supported on a fixed pivot at one end and having its other end connected with said means; two spaced posts mounted on said beam; a vertically movable bar located midway between said posts; mechanism connected with the lower end of said bar and adapted to pull downwardly thereon; an equalizer bar attached to the upper end of said first-named bar; two hooks adjustable along said equalizer bar and adapted detachably to engage with a structural unit resting on said posts.

7. In apparatus for testing structural units of the type described, the combination with load indicating means; of a beam supported on a fixed pivot at one end and having its other end connected with said means; two spaced posts mounted on said beam; mechanism adapted detachably to engage with and apply a downward pull on a structural unit resting on said posts; and members adapted to bear laterally against such unit to retain the same in proper position on said posts.

8. In apparatus for testing structural units of the type described, the combination with load indicating means; of a beam supported on a fixed pivot at one end and having its other end connected with said means; two spaced posts mounted on said beam; mechanism adapted detachably to engage with and apply a downward pull on a structural unit resting on said posts; and members adapted to bear laterally against such unit to retain the same in proper position on said posts, said means including paired fingers oscillatorily mounted on opposite sides of said unit.

9. In apparatus for testing structural units of the type described, the combination with load indicating means; of a beam supported on a fixed pivot at one end and having its other end connected with said means; two spaced posts mounted on said beam; mechanism adapted detachably to engage with and apply a downward pull on a structural unit resting on said posts; and members adapted to bear laterally against such unit to retain the same in proper position on said posts, said means including two parallel shafts journaled above said beam, said shafts being intergeared to rotate in unison but in opposite directions, and radial fingers attached to said shafts and adapted to be swung either into horizontal or vertical positions as desired.

10. In apparatus for testing structural units of the type described, the combination with load indicating means; of a beam supported on a fixed pivot at one end and having its other end connected with said means; two spaced posts mounted on said beam; mechanism adapted detachably to engage with and apply a downward pull on a structural unit resting on said posts; and members adapted to bear laterally against such unit to retain the same in proper position on said posts, said means including two parallel shafts journaled above said beam, said shafts being intergeared to rotate in unison but in opposite directions, means for operating said shafts located at one end thereof, and radial fingers attached to said shafts and adapted to be swung either into horizontal positions as desired.

Signed by me this 18th day of Sept. 1925.

STANLEY MACOMBER.

engage with and apply a downward pull on a structural unit resting on said posts; and members adapted to bear laterally against such unit to retain the same in proper position on said posts, said means including two parallel shafts journaled above said beam, said shafts being intergeared to rotate in unison but in opposite directions, means for operating said shafts located at one end thereof, and radial fingers attached to said shafts and adapted to be swung either into horizontal positions as desired.

Signed by me this 18th day of Sept. 1925.

STANLEY MACOMBER.

Certificate of Correction.

It is hereby certified that in Letters Patent No. 1,595,160, granted August 10, 1926, upon the application of Stanley Macomber, of Massillon, Ohio, for an improvement in "Testing Apparatus," an error appears in the printed specification requiring correction as follows: Page 4, line 12, claim 10, after the word "horizontal" insert the words *or vertical;* and that the said Letters Patent should be read with this correction therein that the same may conform to the record of the case in the Patent Office.

Signed and sealed this 21st day of December, A. D. 1926.

[SEAL.]

M. J. MOORE,
*Acting Commissioner of Patents.*

Certificate of Correction.

It is hereby certified that in Letters Patent No. 1,595,160, granted August 10, 1926, upon the application of Stanley Macomber, of Massillon, Ohio, for an improvement in "Testing Apparatus," an error appears in the printed specification requiring correction as follows: Page 4, line 12, claim 10, after the word "horizontal" insert the words *or vertical;* and that the said Letters Patent should be read with this correction therein that the same may conform to the record of the case in the Patent Office.

Signed and sealed this 21st day of December, A. D. 1926.

[SEAL.]

M. J. MOORE,
*Acting Commissioner of Patents.*